United States Patent
Losier

[11] 3,719,243
[45] March 6, 1973

[54] RETRACTABLE UNDER SLIDE PANEL FOR DISABLED SNOWMOBILES

[75] Inventor: Joseph Gustave Losier, New Brunswick, Canada

[73] Assignees: Joseph Renald Losier, Tracadie, New Brunswick; Nicholas Dellelce, Sudbury, Ontario, Canada

[22] Filed: Feb. 18, 1971

[21] Appl. No.: 116,497

[52] U.S. Cl. .................................. 180/5 R, 280/19
[51] Int. Cl. ..................... B62b 15/00, B62m 27/02
[58] Field of Search ......................... 280/19; 180/5 R

[56] References Cited

UNITED STATES PATENTS 3,563,562  2/1971  Carlin.................................280/19

Primary Examiner—Benjamin Hersh
Assistant Examiner—Robert R. Song
Attorney—Clarence A. O'Brien and Harvey B. Jacobson

[57] ABSTRACT

An elongated sheet of flexible material stored in a compact rolled state at one end of a snowmobile upon a reel provided for supporting and winding the sheet of flexible material. The reel is positioned slightly endwise outwardly and above the adjacent end of the endless track of the associated snowmobile and the strip or panel of flexible material wound on the reel may be unwound from the latter, passed lengthwise beneath the lower reach of the endless track of the snowmobile and anchored to the remote end of the snowmobile. The panel is of a width adapted to span the entire transverse extent of the associated endless track and thereby is operative to form a smooth undersurface for that portion of the associated snowmobile normally occupied by the lower reach of the endless track assembly of the snowmobile. This smooth undersurface enables the snowmobile, when disabled and when the flexible panel is disposed in operative position, to be readily manually pushed or towed behind another snowmobile or similar vehicle.

7 Claims, 7 Drawing Figures

PATENTED MAR 6 1973 3,719,243

Joseph Gustave Losier
INVENTOR.

BY *Clarence A. O'Brien*
and *Harvey B. Jacobson*
Attorneys

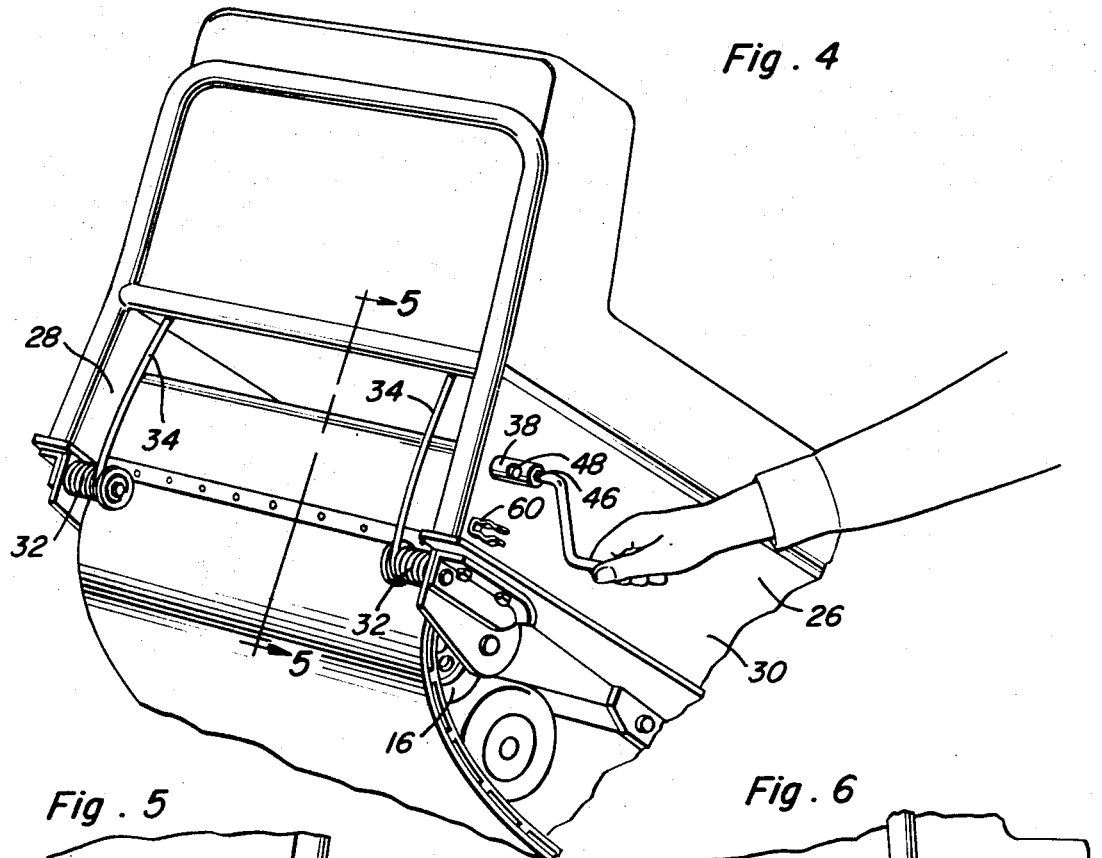
Fig. 4
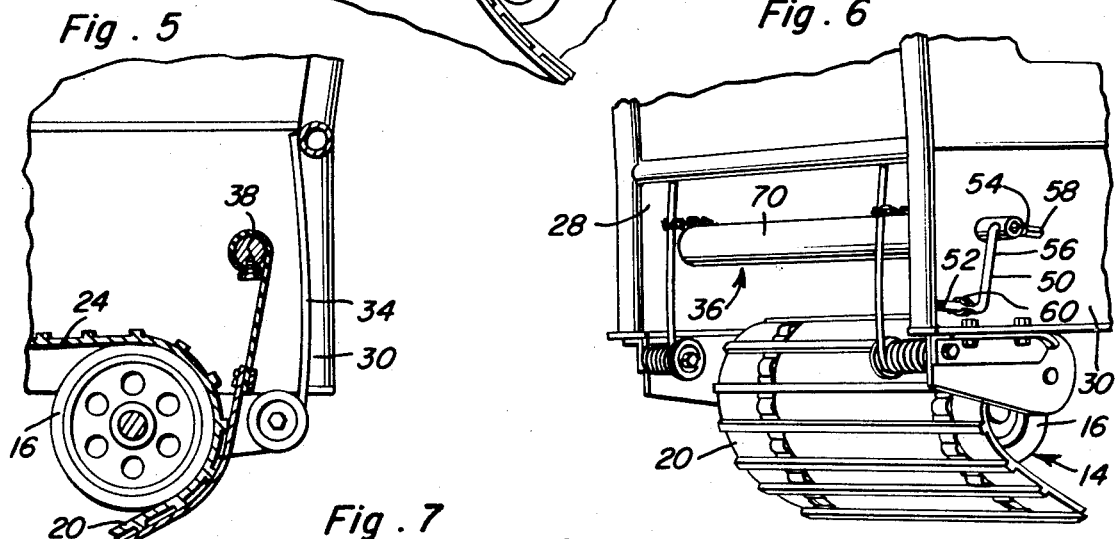
Fig. 5
Fig. 6
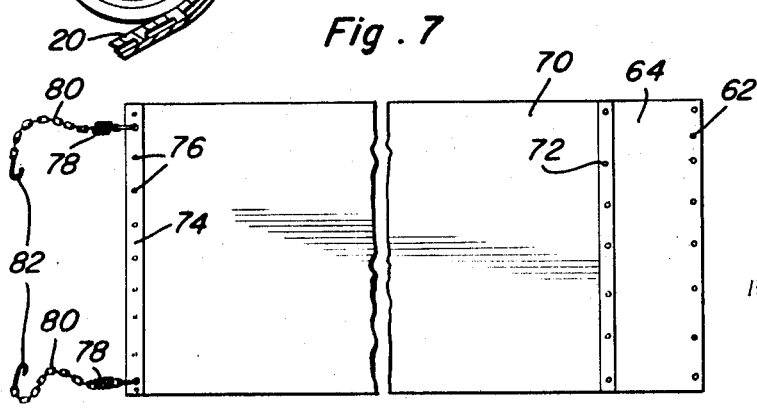
Fig. 7
Joseph Gustave Losier
INVENTOR.

RETRACTABLE UNDER SLIDE PANEL FOR DISABLED SNOWMOBILES

The instant invention includes the provision of a simple, and inexpensive attachment for snowmobiles that may be utilized in rendering a disabled snowmobile to be more easily towed or pushed over snow covered surfaces. The attachment includes structural features adapting it for securement to and use in conjunction with substantially all makes of snowmobiles presently being produced and it may also serve the purpose of providing a means in preventing the lower reach of the endless track of a snowmobile which is not being used, at least temporarily, from becoming frozen to the snow covered ground upon which the snowmobile rests.

While snowmobiles are becoming more reliable there is still the ever present chance that a malfunction of some mechanical component of a snowmobile will render it incapable of being propelled under its own power. Should this occur while some distance from a conventional vehicle upon which the snowmobile may be loaded and transported to a point of repair, considerable difficulty is encountered in pushing, dragging or towing such a disabled snowmobile to a location upon which it may be loaded upon a conventional vehicle for transportation to a repair shop. Further, even through other snowmobiles may be present which may be utilized to tow a disabled snowmobile, if the malfunction of the disabled snowmobile is such that the endless track assembly is immovable, there are some snow conditions which would prevent an operative snowmobile from obtaining sufficient traction to tow such a disabled snowmobile.

It is accordingly the main object of this invention to provide an inexpensive attachment for snowmobiles which may be carried on an associated snowmobile in a compact stored condition and yet which may be utilized to render even a disabled snowmobile having an immovable endless track assembly capable of being readily pushed or towed over snow covered surfaces.

Another object of this invention, in accordance with the immediately preceding object, is to provide an elongated flexible panel attachment for a snowmobile which may be secured lengthwise beneath the endless track of a disabled snowmobile so as to present a smooth undersurface capable of readily sliding over snow covered surfaces.

Another object of this invention is to provide an attachment in accordance with the preceding objects including a winding reel mounted on the associated snowmobile in an unobtrusive position for winding the elongated flexible panel portion of the attachment thereon whereby the panel portion may be retained in a compact stored condition.

Yet another object of this invention is to provide an attachment constructed in a manner whereby it may be readily extended from its stored position to an operative position by a single person having only the necessary strength to tilt a snowmobile on its side.

Another important object of this invention is to provide an attachment for a snowmobile capable of preventing the lower reach of the endless track of the snowmobile from freezing to the ground.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a fragmentary rear perspective view of the snowmobile illustrating the manner in which the panel portion of the attachment may be rolled upon the reel portion of the attachment;

FIG. 5 is a fragmentary transverse longitudinal vertical sectional view taken substantially upon the plane indicated by the section line 5—5 of FIG. 4;

FIG. 6 is a further fragmentary rear perspective view of the snowmobile with the attachment of the instant invention disposed in a compact stored condition; and FIG. 7 is a plan view of the panel portion of the attachment with the central portion thereof being broken away.

Figure 1:
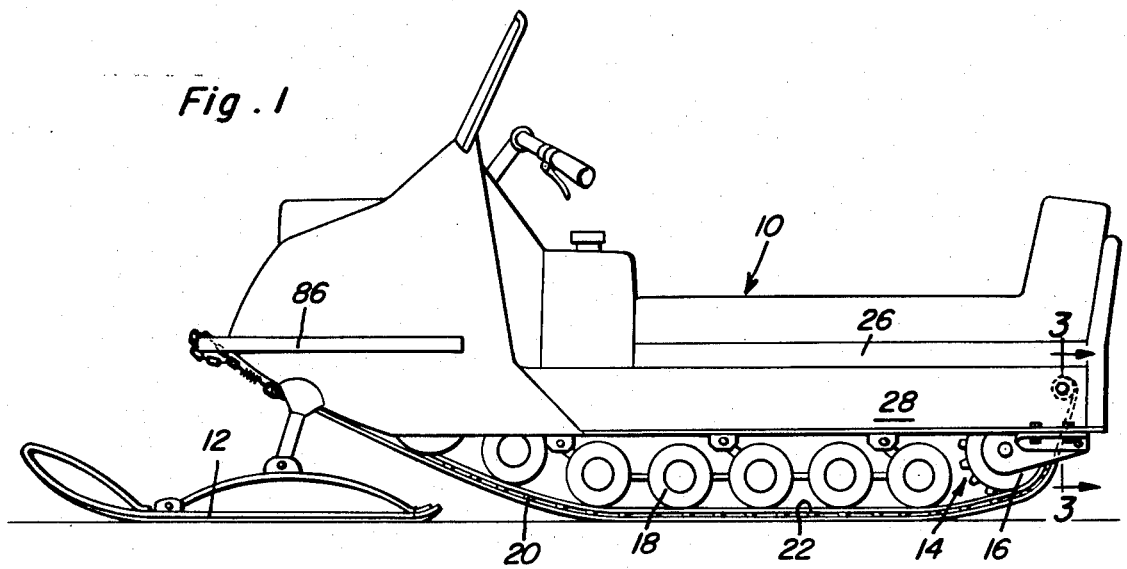
FIG. 1 is a side elevational view of a conventional form of snowmobile with the attachment of the instant invention supported therefrom and disposed in operative position.
Figure 2:
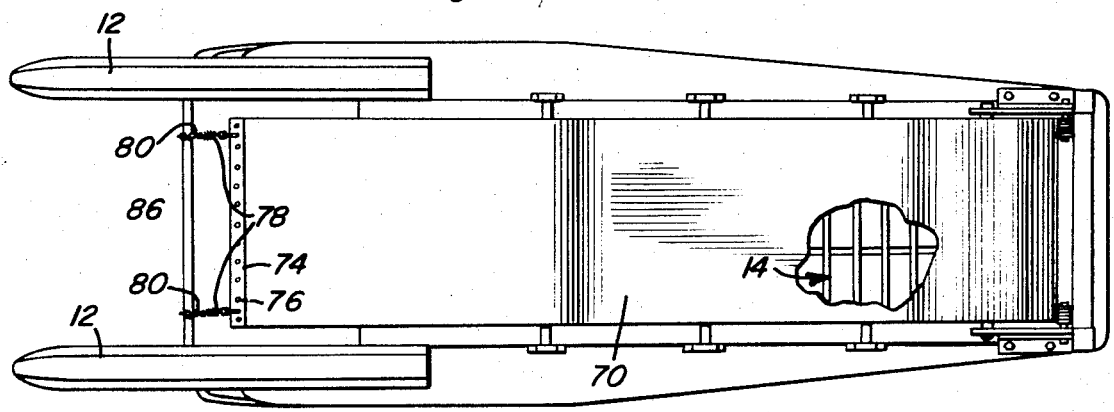
FIG. 2 is a bottom plan view of the assemblage illustrated in FIG. 1 with a portion of the panel portion of the attachment broken away.
Figure 3:
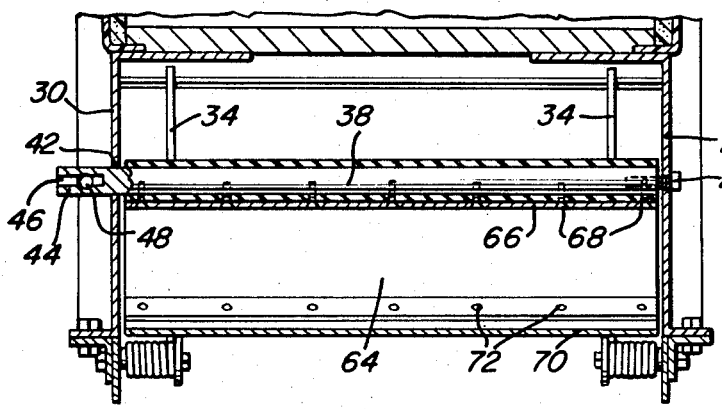
FIG. 3 is an enlarged fragmentary transverse vertical sectional view taken substantially upon the plane indicated by the section line 3—3 of FIG. 1.

Referring now more specifically to the drawings, the numeral 10 generally designates a conventional form of snowmobile including a pair of opposite side front dirigible skis 12 and a central longitudinally extending rear endless track structure referred to in general by the reference numeral 14.

The endless track structure 14 includes a pair of rear idler sprockets 16, a pair of forward opposite side drive sprockets (not shown) and a plurality of bogie-type idler wheels 18. The forward drive sprockets are of course powered by an engine (not shown) housed in the forward body portion of the snowmobile 10. An endless track assembly 20 is entrained about the rear sprockets 16, the front sprockets and the idler or bogie wheels 18 and the track assembly includes a lower reach 22 as well as an upper reach 24.

The snowmobile 10 includes a body 26 provided with a pair of depending opposite sides 28 and 30 which extend longitudinally throughout approximately the rear two-thirds of the body 26 and the upper reach 24 of the endless track assembly 20 is received between the sides 28 and 30. A pair of opposite side rear springs 32 are provided and operatively connected to the rear idler sprockets 16 to maintain proper tension on the endless track assembly 20 and the springs 32 include upwardly extending arms 34 to be referred to hereinafter.

The attachment of the instant invention is referred to in general by the reference numeral 36 and includes a reel or winding roller 38 journaled between the rear ends of the sides 28 and 30. The winding roller is journaled from the side 28 by means of a fastener 40 secured through the side 28 and in the adjacent end of the roller 38 and the end of the roller 38 remote from the side 28 is journaled through an opening 42 formed in the side 30. The extended end 44 of the roller 38 includes a non-circular blind bore 46 and a transverse bore 48. A crank 50 is provided and includes a handle end 52 and a drive end 54. The ends 52 and 54 generally parallel each other and are connected by means of a generally right angled lever arm 56 extending therebetween. Further, the drive end includes a non-circular terminal end 58 which is receivable in a non-circular blind bore 46. In addition, the drive end 54 including the terminal end 58 is receivable through the transverse bore 48 and a spring-type anchor clip 60 is secured to the side 30 in any convenient manner.

When it is desired to retain the roller or reel 38 in position against rotation, the drive end 54 of the crank 50 is inserted through the transverse bore 48 and the handle end 52 is anchored in the anchor clip 60, see FIG. 6. However, when it is desired to utilize the crank 50 for turning the roller or reel 38, the handle end 52 is disengaged from the anchor clip 60, the drive end 54 is withdrawn from the transverse bore 48 and the terminal end 58 is inserted in the blind bore 46 whose cross-sectional shape is complementary to the cross-sectional shape of the terminal end 58.

One end edge portion 62 of a flexible panel 64 is secured to the winding reel or roller 38 by means of an anchor strap 66 and suitable fasteners 68. The other end of the panel 64 is secured to an adjacent end of a longer sheet metal panel 70 by means of suitable fasteners 72 and the remote end of the sheet metal panel 70 has a reinforcing strip 74 secured thereto by means of suitable fasteners 76 and corresponding ends of similar tension springs 78 are anchored to the reinforcing strip 74 and have a first pair of ends of a pair of link chain sections 80 anchored to their other ends, the free ends of the link chain sections 80 being provided with hook members 82 for a purpose to be hereinafter more fully set forth.

With the end of the panel 64 remote from the reinforcing strip 74 anchored to the winding reel or roller 38, it may be seen that the crank 50 may be utilized to impart rotation to the winding reel or roller 38 so as to wind not only the panel 64 but also the sheet metal panel 70 on the winding reel or roller 38. After the panels 64 and 70 have been wound on the roller 38 in a compact state, the hooks 82 are engaged with the aforementioned arms 34 of the springs 32 and the lever 50 may be secured in the position thereof illustrated in FIG. 6 in order to retain the winding reel or roller 38 against rotation and to thus maintain the panels 64 and 70 tightly wound on the winding reel or roller 38.

On the other hand, should the endless track assembly 20 of the snowmobile 10 become immobilized and it is therefore necessary to slide the snowmobile 10 over the ground either by manual force or by pulling behind another snowmobile, the snowmobile 10 is first rolled on its left side after which the lever 50 may be disengaged from the anchor clip 60 and the winding reel 38. Then, the hooks 82 are disengaged from the arms 34 and the sheet metal panel 70 is unwound from the winding reel or roller 38 and passed beneath the lower reach 22 of the endless track assembly. The free ends of the link chain section 70 may then be passed about the front bumper 86 of the snowmobile 10 and the hooks 82 may be engaged with the ends of the link chain sections 80 adjacent the tension springs 78. Thereafter, the crank 50 has its terminal end 58 seated in the blind bore 46 and the crank 50 is utilized to wind at least the base end of the panel 64 back onto the winding reel or roller 38 so as to tension the panels 64 and 70 and at least slightly stretch the tension springs 78. Then, the lever 50 may be secured in the position thereof illustrated in FIG. 6 of the drawings so as to maintain the panels 64 and 70 in a tensioned condition. If it is desired, final tensioning of the panels 64 and 70 by winding the base end of the panel 64 on the winding reel or roller 38 may be accomplished while the drive end 54 of the crank 50 is passed through the transverse bore 48 thereby enabling the handle end 52 of the crank 50 to be more readily engaged with the anchor clip 60.

After the sheet metal panel has thus been positioned beneath the lower reach 22 of the endless track assembly 20, the snowmobile 10 may then be righted and easily slid over a snow covered surface, either by hand or by pulling behind another snowmobile or other vehicle.

The attachment 36 is also useful when it is desired to prevent the lower reach of the endless track 20 from freezing to the ground during periods of non-use of the snowmobile 10. When use of the snowmobile 10 has terminated, the attachment 36 may be placed in the operative position just as though the snowmobile 10 had been disabled and while the undersurface of the panel 70 may have a tendency to freeze to the ground, inasmuch as this undersurface is extremely smooth the snowmobile 10 may more readily be broken from the ground by tilting the snowmobile on its left side, as would be done before the attachment 36 could be placed in its compact stored condition. If the upper surface of the sheet metal panel 70 is frozen to the lower reach 22 of the endless track assembly 20 after the panel 70 has been dislodged from frozen ground, the sheet metal panel 70 may be readily "peeled" from the lower reach of the endless track assembly 20 before it is wound into its compact state. Thus, the very frustrating experience of having the endless track assembly of the snowmobile freeze to the ground may be avoided by utilizing the attachment 36 of the instant invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a snowmobile of the type including at least one driven endless track assembly provided with upper and lower reaches, a slide attachment for the endless track assembly, said attachment comprising an elongated panel of flexible material disposed lengthwise beneath the lower reach of the endless track assembly, the opposite ends of the elongated panel being stationarily anchored relative to the opposite ends of the endless track assembly, said snowmobile defining depending opposite side portions adjacent and between which one end of the endless track assembly is received, a winding member journaled between said opposite side portions for rotation about a horizontal transverse axis, one end of said elongated panel being operatively connected to said winding member for winding thereon and unwinding therefrom, said snowmobile further including a body portion adjacent the other end of the endless track assembly, the other end of said elongated panel and the last-mentioned body portion including coacting means releasably anchoring said other end of said elongated panel to said last-mentioned body portion.

2. The combination of claim 1 wherein the width of said elongated panel is substantially equal to the width of the endless track assembly.

3. The combination of claim 1 wherein said snowmobile and attachment include means for releasably securing said elongated panel beneath said lower reach in a lengthwise tensioned condition.

4. The combination of claim 1 including crank means operatively associated with said winding member and disposed outwardly of one of said side portions for manually imparting rotation thereto.

5. The combination of claim 4 wherein said crank means and winding member include coacting means for selectively supporting said crank from said winding member in first and second positions for manually rotating said winding member and retaining said winding member against rotation relative to said body portion, respectively, said crank means and said body portion including coacting means, when said crank means is in said second position, for releasably anchoring said crank to said body portion against swinging about said axis.

6. The combination of claim 1 wherein said coacting means includes tension springs interposed between said body portion and said other end of said panel member.

7. The method of preventing the lower reach of the endless track assembly of a snowmobile from freezing to the ground, said method comprising the steps of tilting the snowmobile over on one of its sides, lengthwise unreeling one end portion of a reversely bendable elongated flexible panel from a winding member journalled transversely of the snowmobile at one end of the endless track assembly and upon which the panel is wound, passing the one end portion of the panel member along the lower reach of the endless track assembly past the opposite end thereof, anchoring the one end portion of the panel to the snowmobile, winding any excess length of panel unwound from said winding member back onto the latter to tension the panel member, and thereafter tilting the snowmobile back to an upright position.

* * * * *